United States Patent [19]

Reddy et al.

[11] Patent Number: 5,084,144

[45] Date of Patent: Jan. 28, 1992

[54] HIGH UTILIZATION SUPPORTED CATALYTIC METAL-CONTAINING GAS-DIFFUSION ELECTRODE, PROCESS FOR MAKING IT, AND CELLS UTILIZING IT

[75] Inventors: N. R. K. Vilambi Reddy, Salem, N.H.; Everett B. Anderson, Reading; Earl J. Taylor, Chelmsford, both of Mass.

[73] Assignee: Physical Sciences Inc., Andover, Mass.

[21] Appl. No.: 560,206

[22] Filed: Jul. 31, 1990

[51] Int. Cl.$^5$ .................... C25D 5/00; C25B 11/04
[52] U.S. Cl. ................. 205/104; 204/252; 204/290 R; 429/12; 429/41; 429/42; 429/44; 429/45; 205/161; 205/184; 205/917
[58] Field of Search .............. 204/23, 24, 29, 38.1, 204/38.7, 290 R, 291, 294, 252; 429/12, 41, 42, 44, 45

[56] References Cited

U.S. PATENT DOCUMENTS

| | | | |
|---|---|---|---|
| 3,276,976 | 10/1966 | Juliard | 204/43 |
| 3,282,875 | 11/1966 | Connolly et al. | 260/29.6 |
| 3,287,168 | 11/1966 | Marsh | 136/86 |
| 3,322,576 | 5/1967 | Young | 136/121 |
| 3,461,044 | 8/1969 | Lyons et al. | 204/3 |
| 3,779,812 | 12/1973 | Witherspoon | 427/115 |
| 3,784,399 | 1/1974 | Grot | 117/62.1 |
| 3,849,243 | 11/1974 | Grot | 161/189 |
| 3,979,227 | 9/1976 | Katz et al. | 427/115 |
| 4,141,801 | 2/1979 | Perry | 204/2.1 |
| 4,265,714 | 5/1981 | Nolan et al. | 204/1 T |
| 4,433,082 | 2/1984 | Grot | 524/755 |
| 4,541,905 | 9/1985 | Kuwana et al. | 204/38.7 |
| 4,544,458 | 10/1985 | Grot | 204/98 |
| 4,610,938 | 9/1986 | Appleby | 429/42 |
| 4,876,115 | 10/1989 | Raistrick | 427/115 |

FOREIGN PATENT DOCUMENTS

| | | | |
|---|---|---|---|
| 647004 | 12/1984 | Switzerland. | |
| 2060703A | 1/1981 | United Kingdom | 204/291 |
| 2101160 | 12/1983 | United Kingdom. | |

Primary Examiner—John Niebling
Assistant Examiner—Kathryn Gorgos

[57] ABSTRACT

Gas-diffusion electrodes (GDE's) suitable for use with a solid polymer electrolyte (s.p.e.), particularly in s.p.e. fuel cells, which GDE's provide unusually highly efficient use of noble or precious electrocatalytic metals, are obtained by starting with a GDE which is essentially fully fabricated except for electrocatalytic metal treatment and s.p.e. treatment, e.g. a carbon GDE having a gas-permeable hydrophobic face and a particulate carbon-containing catalytic face. This untreated GDE is treated by a. impregnating an s.p.e. solutuion into the catalytic face until the solution penetrates part way into the cross-section of the GDE, especially into the carbon particulate or other support material, but not as far as the hydrophobic, gas permeable face, b. inserting the thus-treated GDE and a counterelectrode into a plating bath containing, for example, $M^+$, $M^{++}$, and/or $M^{+++}$ ions, where M is a metal of Group VIII or I-B of the Periodic Table, and c. applying an interrupted current (periodically interrupted or a single, long pulse <2 minutes in duration) to the thus-treated GDE, so that metal particles <10 nm (<100A) in average particle size deposit on the particulate support material (e.g. high surface are carbon) of the catalytic face, but essentially only on sites where the support material is already in contact with the previously-deposited s.p.e. Because the deposited metal particles are in contact with an ionic pathway (through the s.p.e.) and an electronic pathway (through the support material), virtually every deposited metal particle is effective in catalyzing the electro-oxidation or electro-reduction of a reactant gas supplied to the gas-permeable hydrophobic face of the GDE during cell operation. s.p.e. fuel cells of this invention provide good performance with GDE loadings of 0.05–4.0 mg/cm$^2$ of catalytic metal, a performance comparable to cells with GDE loadings of about 0.5 mg/cm$^2$ of the same metal.

20 Claims, No Drawings

HIGH UTILIZATION SUPPORTED CATALYTIC METAL-CONTAINING GAS-DIFFUSION ELECTRODE, PROCESS FOR MAKING IT, AND CELLS UTILIZING IT

This invention was made with the assistance of a grant from the National Science Foundation. The U.S. government has certain rights in this invention.

TECHNICAL FIELD

This invention relates to methods for making gas-diffusion electrodes with low or modest loadings of expensive catalytic metals especially suited for use in solid polymer electrolyte (s.p.e.) electrochemical cells, e.g. solid polymer electrolyte fuel cells. An aspect of this invention relates to the gas-diffusion electrodes (GDE's) themselves and the electrochemical cells into which they are incorporated. Still another aspect of this invention relates to cells (e.g. fuel cells) in which the solid polymer electrolyte comprises a fluorinated cation-exchange polymer obtained from an unsaturated fluorinated monomer. Still another aspect of this invention relates to a GDE structure comprising particles or fibers or sintered particles or fibers of an electrically conducting or semiconducting material such as carbon, an electrically-conducting oxide of titanium, or the like, and a combination of s.p.e. and supported catalytic metal deposited on the electrically conducting or semiconducting material.

DESCRIPTION OF THE PRIOR ART

It has long been known in the art of electrochemistry that the electrolyte of an electrochemical cell does not have to be an aqueous liquid such as sulfuric acid, phosphoric acid, a solution of an alkali metal hydroxide, a water solution of a salt, or the like. Indeed, it is not necessary that the electrolyte be a liquid of any sort, aqueous or non-aqueous. Solid ion exchange polymers can provide the necessary ionic pathways between cathodes and anodes. Accordingly, many years ago it was discovered that the ion exchange polymers which serve as membranes dividing electrolytes into catholyte and anolyte can themselves serve as the cell electrolyte. For an example of the type of polymer which can function as a solid polymer electrolyte, see U.S. Pat. No. 3,282,875 (Connolly et al), issued Nov. 1, 1966. For an example of the use of such ion exchange polymers as membranes to separate the anode and cathode compartments of an electrolysis cell, see U.S. Pat. No. 4,544,458 (Grot et al), issued Oct. 1, 1985. An electrochemical fuel cell utilizing a layer of fluorinated acid-containing polymer bonded to the catalytic surface of an electrode is disclosed in U.S. Pat. No. 4,610,938 (Appleby), issued Sept. 9, 1986. An s.p.e./electrode assembly formed by applying to the electrode structure a fluorinated ion exchange resin is disclosed in British published application 2,101,160 (Diamond Shamrock Corp.), published Jan. 12, 1983.

The use of solid polymer electrolytes (s.p.e.'s) in fuel cells and other electrochemical cells has important implications. For example, many of the difficulties and hazards posed by liquid electrolytes are eliminated. Moreover, fuel cells with solid polymer electrolytes tend to have good "cold start" properties and can be operated at very modest temperatures. This low-temperature feature provides a sharp contrast to the molten carbonate class of fuel cells, which are only operative at high temperatures. Even the technologically mature and reliable direct physical contact between deposited solid polymer "phosacid" fuel cell (which utilizes an aqueous phosphoric acid electrolyte) tends to operate more effectively at temperatures above 50 or even 80° C.

Despite the potential advantages of solid polymer electrolyte fuel cells, their development has been impeded by the need for high concentrations of expensive catalytic metals (e.g. precious metals such as gold and silver or noble metals of Group VIII of the Periodic System of the Elements) on the electrocatalytic surfaces of the fuel cell electrodes. In the case of state-of-the-art phosacid cells, so-called "supported" catalytic metals can be used on the catalytic surfaces of the electrodes thereby decreasing the requirements for these expensive metals to 2.0 mg/cm$^2$ or less, typically <1 mg/cm$^2$. Supported noble and precious metal catalysts have been proposed for use in the electrodes of solid polymer electrolyte fuel cells, but attempts to use supported catalytic metals have not been notably successful. As a result, typical state-of-the-art solid polymer electrolyte fuel cells utilize unsupported noble metals such as "platinum black". The size of the "platinum black" particles is relatively large, e.g. 10 nanometers and larger—at least two or three times (more typically 6 to 10 times) the size of platinum particles used in "supported" platinum electrocatalysts. For particles the size of, say, 10 nanometers (100 Ångstroms), the specific surface area is small, e.g. 25–30 m$^2$/g. Consequently, the fraction of surface atoms is less than 10%, and hence, the maximum catalyst utilization is only 10%.

As a result, a state-of-the-art s.p.e. fuel cell electrode typically contains about 4 mg Pt/cm$^2$, and the catalyst utilization is low.

A possible reason for the difficulties of using supported platinum electrocatalysts in solid polymer electrolyte fuel cells is demonstrated in a study carried out by McBreen, "Voltametric Studies of Electrodes in Contact with Ionomeric Membranes", J. Electrochem. Soc. 132:112 (1985). According to McBreen's simple yet elegant study, platinum supported on carbon would not be in ionic contact with the s.p.e.. As a result, this supported platinum would not be electrochemically active for oxygen reduction or hydrogen oxidation.

Subsequent to McBreen's study, solutions were proposed for the problems connected with obtaining an electrochemically active supported platinum suitable for use in a solid polymer electrolyte cell. It has been suggested, for example, that the solid polymer electrolyte could be applied as a liquid composition, due to the solubility of many solid polymer electrolyte in polar organic liquid solvents, alone or in combination with water. See, for example, U.S. Pat. No. 4,433,082 (Grot), issued Feb. 21, 1984. It has been further suggested that the solid polymer electrolyte solution could be painted or sprayed onto or otherwise applied to the catalytic face of a gas-diffusion electrode containing supported platinum or some other supported noble metal. See U.S. Pat. No. 4,876,115 (Raistrick), issued Oct. 24, 1989 and the abstract entitled "Modified Gas Diffusion Electrodes for Proton Exchange Fuel Cells" published in the Extended Abstracts of the Electrochemical Society of Boston, Mass. (1986). Raistrick has proposed painting or spraying a solution of solubilized NAFION® (trademark for ion-exchange polymer) into a carbon-supported platinum GDE prior to pressing the electrode against the s.p.e.. The ultimate result of this approach is a hydrogen/oxygen fuel cell with a performance (for NAFION ®-impregnated electrodes containing 0.5 mg Pt/cm$^2$ supported on high surface area carbon) comparable to state-of-the-art solid polymer electrolyte fuel cell electrodes containing 4 mg of low surface area unsupported platinum per square centimeter of the electrode. It may be noteworthy that in the actual practice of the Raistrick approach, a layer of platinum is optionally sputtered onto the NAFION-impregnated electrode prior to its operation in a solid polymer electrolyte fuel cell. One can only speculate regarding the importance of the sputtered layer of platinum as compared to the carbon-supported platinum of the Raistrick electrode, but it may be reasonable to conclude that in this optional embodiment the carbon-supported platinum plays a lesser role than the sputtered layer of platinum.

Since it is extremely difficult to quantify or control the extent of NAFION ® impregnation using the painting technique, and since platinum sputtering may also present scale-up problems, manufacturability, further improvements in solid polymer electrolyte fuel cells are still being sought.

The art of applying catalytic metal only to specific portions of support material has undergone some development outside the field of s.p.e. fuel cells, e.g. in the case of phosphoric acid fuel cells, as described in U.S. Pat. No. 3,979,227 (Katz et al), issued Sept. 7, 1976.

SUMMARY OF THE INVENTION

It has now been discovered that a fully catalyzed, highly efficient gas-diffusion electrode (GDE) suitable for use in a solid polymer electrolyte cell can be made from a GDE which is initially free of noble and precious metals, and wherein, after catalyzation (or further catalyzation) with noble or precious metal, the loading of this expensive catalytic metal is either very low (e.g. less than 1 mg/cm$^2$) or is somewhat higher but also capable of unusually high performance. Prior to treatment according to the process of this invention, a conventional GDE structure is provided, minus the usually employed expensive catalytic metal (i.e. minus a platinum group metal or the like). These conventional structures have an essentially gas-permeable hydrophobic layer and a catalytic layer or catalyzable layer comprising a support material made up of fibers or particles or sintered fibers or particles of an electrically conductive material such as carbon, a non-noble and non-precious particulate metal (such as nickel), a metalloid, an electrically conducting or semiconducting ceramic or transition metal oxide, or the like. It is this catalytic or catalyzable layer to which the relatively rare or expensive catalytic metal particles and solid polymer electrolyte are to be applied. For convenience of description, the GDE structure which is free or essentially free of noble or precious metals and their compounds (e.g. free of metals and compounds of Groups VIII, second and third triads, of the Periodic Table or gold or silver) is hereafter referred to as "the uncatalyzed GDE", even though this GDE may have some catalytic activity by virtue of its "catalyzable layer" comprising high surface area carbon and/or a non-noble transition metal and/or transition metal compound (e.g. Ni, a sub-oxide of titanium, etc.). (Even uncatalyzed carbon particles can exhibit electrocatalytic activity, despite a significant lack of H—H bond-stretching capability.) In other words, the "uncatalyzed GDE" is a low performance (<40 mA/cm$^2$ at 100 mV) GDE, while the "catalyzed GDE" is a high performance GDE, capable of producing current densities in excess of 50 mA/cm$^2$ at 400 to 600 mV. The method of this invention comprises:

a. impregnating into the catalytic layer of the uncatalyzed GDE a solution comprising an ion-exchange polymer (the solid polymer electrolyte), until this solution has wetted the catalytic layer of the uncatalyzed GDE structure and has penetrated part/whole way into the cross-section of this structure (prior to this impregnation step, the uncatalyzed GDE structure can be totally free of catalytic metal on the surface of the support material and can be totally free of ion-exchange polymer), b. inserting the thus-treated GDE, along with a counterelectrode, in a plating bath containing ions, at least some of these ions being an oxidized form of the catalytic metal to be applied, e.g. cations of a metal or metals of Group VIII or I-B of the Periodic Table or, less preferably, anions containing one of these metals in some other oxidized form, c. applying a pulsed direct current to the thus-treated GDE, so that well dispersed catalytic metal particles not larger than about 10 nanometers (100 Å), e.g. <5 nanometers (<50A) in average particle size deposit on the support material of the catalytic face of the treated GDE, but essentially only on sites where support material is in contact with ion-exchange polymer which was deposited there during the impregnating step (step a). The current applied to the thus-treated GDE is preferably neither a continuous, constant direct current (D.C.), which would result in plating or agglomeration effects nor a pulsed-D.C. of short-duration pulses. This applied current is perhaps best described as an "interrupted" direct current characterized by on-times of long duration (>1 second, e.g. 0.1 to 2 minutes), or, if desired, a single on-time of up to 2 minutes. If low levels of noble or precious metal deposition (e.g. 0.05 mg/cm$^2$) are desired, the single on-time (single interruption) approach can be used so long as the current is interrupted before plating or agglomeration effects can occur.

Because many types of ion-exchange polymer useful as solid polymer electrolytes will dissolve in polar solvents, the solution used during the impregnating step can comprise 0.1 to 50 parts by weight (preferably 1-10 parts per weight) of solid polymer electrolyte dissolved in a relatively volatile polar organic liquid solvent such as a low molecular weight monofunctional or difunctional alcohol, ether, or the like, alone or in admixture with other polar solvents such as water. It is preferred that all or most traces of the solvent be removed after the completion of the impregnating step so that the solid polymer electrolyte will be present in the GDE structure as solid, essentially dry material. Because the preferred solid polymer electrolytes used in this invention have relatively low solubility in water at ordinary cell-operation temperatures, the thus-deposited solid polymer electrolyte is substantially immobilized and will not migrate during the pulsed direct current deposition step; moreover, the interface between electrocatalyst, gaseous reactant and solid polymer electrolyte will remain substantially in the same area during cell operation.

During step c (the interrupted-current, electro-deposition step), the peak current density is moderately high (preferably above 5 mA/cm$^2$), but the on-time of the pulse, though relatively lengthy, should be less than 5 minutes, more preferably less than 2 minutes.

A high-performance GDE made by the process of this invention can be used as the cathode and/or the anode of a solid polymer electrolyte cell, e.g. a solid polymer electrolyte fuel cell, or a fuel cell in which the solid polymer electrolyte coating or coatings on the electrode or electrodes are in contact with a liquid electrolyte.

DETAILED DESCRIPTION OF THE INVENTION

Although this invention is not bound by any theory, the principles of operation of a gas-diffusion electrode (GDE) are considered to be fairly well understood and generally relevant to the principles of this invention. A key aspect of any GDE is its ability to provide a complicated interface between a gaseous reactant, a heterogeneous electrocatalyst (such as a particulate noble metal), and an electrolyte. Two different kinds of electrical pathways must be provided to this three-way interface, an ionic pathway (through the electrolyte) and an electronic pathway (typically through an electrically conductive support material, in the case of a supported electrocatalyst). Any electrocatalyst particle which is not at a three-way interface or which is not provided with the requisite electrical pathways is essentially useless and not utilized in the desired fuel cell reaction. If the electrocatalyst comprises a rare or expensive metal such as a noble metal of Group VIII (e.g. platinum) or gold or silver, the presence of a substantial number of useless electrocatalyst particles in the GDE structure has serious implications, including under-utilization of one of the most expensive components of the electrode structure and perhaps less than poor optimization or poor overall cell performance.

In the present invention, it is preferred that no Group VIII or Group I-B metal be present in the GDE structure until the support material has been thoroughly wetted with a solution containing the solid polymer electrolyte. The solvent used to prepare this solution preferably has a vapor pressure at room temperature comparable to or greater than that of water (e.g. >10 mm of mercury at room temperature, more typically 10-500 mm of mercury at 23° C.) and will evaporate from the treated (impregnated) GDE at room temperature or with a very modest application of heat. The thus-dried, previously impregnated GDE may not have perfect contact between solid polymer electrolyte deposits and support material, but there will be at least some direct physical contact between deposited solid polymer electrolyte and fibers or particles or sintered fibers or particles of support material. Accordingly, during the interrupted-current electrodeposition of catalytic metal, the metal catalyst particles (since they must be obtained from ions such as metal cations) will not form on the surface of the support material unless that support material is in contact with an ionic pathway provided by the solid deposits of solid polymer electrolyte. Moreover, no electrodeposition of the rare or expensive catalytic metal will occur anywhere along an ionic pathway unless that pathway leads to or comes in contact with electrically conducting or semiconducting support material. Because the electrodeposition step is carried out with a interrupted current governed by a wave form and/or on-time favoring small particle formation, essentially all of the electrodeposited particles of rare or expensive catalytic metal will be very small, averaging less than 100 Å in size, more typically less than 50 Å. Accordingly, essentially all of the electrodeposited catalytic metal will have extremely high surface area and will be provided with both an electronic pathway and an ionic pathway. All that will be needed to complete the utilization of the deposited particle will be the presence of the gaseous reactant. Virtually no noble or precious metal particles isolated or insulated from electrically conductive support material will be present; similarly, virtually no such particles isolated from solid polymer electrolyte will be present. Those electrodeposited catalytic metal particles which are present will generally be utilized when the cell is in operation. Loadings of noble metal (or gold or silver) as low as 0.01 mg per geometric square centimeter of electrode surface will provide a useful level of electrocatalytic activity, and electrodes containing 0.05 mg/cm$^2$ electrocatalytic metal can provide a performance comparable to advanced to state-of-the-art electrodes containing about 10 times as much as the same electrocatalytic metal. Indeed, it is a reasonable rule of thumb to consider electrodes of this invention to be generally about an order of magnitude better than advanced state-of-the-art in their utilization of rare or expensive catalytic metals such as platinum, palladium, ruthenium, gold, silver and the like. Electrodes of this invention are up to about 80 times better in this regard as compared to available solid polymer electrolyte fuel cell GDE's having 4 mg Pt/cm$^2$.

It is important to the concept of this invention that the electrodeposition of rare or expensive catalytic metal particles takes place on the support material after the support material is in place on a fully fabricated (but uncatalyzed or low-performance) gas-diffusion electrode and after that GDE has been impregnated with the ion-exchange polymer (preferably a solid polymer electrolyte). Accordingly, an understanding of conventional GDE design provides important background information which underlies the principles of this invention.

THE UNTREATED GAS-DIFFUSION ELECTRODE

The amount of scientific and patent literature which describes the typical gas-diffusion electrode (GDE) is vast. By way of a brief summary, most of these known GDE structures contain a hydrophobic polymer obtained by fluorinating a hydrocarbon polymer or by polymerizing an unsaturated, partially or fully fluorinated monomer (tetrafluoroethylene, hexafluoropropene, trifluorochloroethylene, less preferably vinylidene fluoride, etc.) and a particulate and/or fibrous, relatively inexpensive electrically conductive material which may or may not be pressed and/or sintered. The preferred electrically conductive material is usually carbon, which may if desired be present in two forms: as a fibrous sheet backing material for structural integrity and as a very finely divided mass of particles which provides the support for a highly active electrocatalytic metal. Since finely divided carbon is itself an electrocatalyst in some circumstances, e.g. oxygen reduction in alkaline electrolyte, useful low-performance gas-permeable electrodes have been prepared which contain essentially only carbon and the hydrophobic polymer and no electrocatalytic metal whatsoever. For high performance fuel cells, however, it is virtually essential that the carbon/hydrophobic polymer GDE be further catalyzed with a metal of Group VIII or Group I-B of the Periodic Table, particularly a metal of the second and third triads of Group VIII.

In the typical conventional GDE structure, the concentration of hydrophobic polymer in the structure increases to a very high level at one face and drops off to a relatively low level at the opposite face. The face provided with the higher level of hydrophobic polymer is permeable to gases, but the hydrophobic polymer protects against flooding of the GDE by a liquid electrolyte. Accordingly, the face with the high concentration of hydrophobic polymer is the gas-permeable (hydrophobic) face which has direct access to the flow of gaseous reactant. This hydrophobic face is sometimes referred to as the "gas" side of the electrode. On the opposite face, where the amount of hydrophobic polymer is relatively low, the amount of finely divided support material is very high. This opposite face can be referred to as the "catalytic" side or face. A greatly magnified cross-section of this typical GDE structure would reveal a fibrous mat protected with hydrophobic polymer on the "gas" side and a mass of tiny support particles on the "catalytic" side.

It is known to treat the support material with Group VIII metal at any one of various stages of fabrication of the GDE. For example, particles of support material can be suspended in a reaction medium containing a Group VIII metal in some dissolved form (e.g. anions of a salt of chloroplatinic acid), and the resulting treated support particles can be subjected to an electrochemical or chemical reduction step, so that tiny particles of Group VIII metal form on the surface of the support particles. The GDE should be substantially fully fabricated (except for the treatment with electrocatalytic metal) prior to use in this invention.

A variety of fibrous carbon materials (carbon cloth, carbon paper, etc.) are commercially available for use as the backing material on the hydrophobic side of the GDE. Several types of very high surface area carbon particles, both graphitized and non-graphitized are available for use as the support material. The surface area of these available support materials can range all the way from as low as 50 m$^2$/g to more than 1000 m$^2$/g (e.g. up to 2000 m$^2$/g). A more typical range of surface area is 200–1200 m$^2$/g. When the carbon support material is non-graphitized it may be more subject to corrosion or attack when the fuel cell is in use. On the other hand, non-graphitized forms of carbon are more wettable and can be easier to work with. The graphitized forms of carbon tend to be relatively resistant to attack in the presence of acidic and even basic electrolytes.

The person skilled in this art is not limited to the use of carbon, either as a backing material or as a support material. Other corrosion-resistant, electrically conductive or semiconducting materials are known and are available or can be made available in high surface area forms and/or as sheet materials, e.g. as sheets of sintered particles. Typically, these corrosion-resistant, porous sheet-like and/or particulate materials are inorganic and may even be metals or metalloids. For example, raney nickel has been used as a support material for noble metals such as platinum. So-called conductive ceramics have also been used in electrode structures. Not all of these materials are ceramics in the strict sense of the term, but some have natural mineral analogs such as perovskite. Another interesting class of materials includes the Magneli Phan suboxides of titanium, $Ti_xO_{2x-1}$, where x is >2; the suboxides in which x=4 and 5 appear most conductive. Many of these materials are transition metal oxides and some are highly corrosion resistant as well as being electrically conductive. Typically, these compounds contain chemically combined oxygen and one or more transition metals of Groups IVB, VB, VIB, or VIII of the Periodic Table. These materials, in particulate form, can be sintered or fused to form rigid porous particles which may themselves have some electrocatalytic activity and may serve as the substrate for an electrocatalytic metal. Since it is desirable for the sheet-like backing layer of the GDE to have a hydrophobic face, it is preferable to use carbon paper or carbon cloth as the sheet-like element of the GDE, and if conductive ceramics are to be used, they would more typically be in the form of finely divided particles having a surface area of at least 10 to 50 m$^2$/g. These fine particles can be mixed with particles of hydrophobic polymer, if desired.

It is generally preferred in this invention that the support material have low resistivity at ordinary temperatures of cell operation (e.g. from 0 to 100° C.). Metals and metalloids typically have resistivities less than $1 \times 10^{-4}$ ohm-cm at ordinary temperatures (e.g. 10–30 C.) and are considered to be highly conductive. Solid graphite has one or two orders of magnitude greater resistivity as compared to metals and metalloids but is nevertheless an excellent conductor, as are most other economically attractive forms of carbon such as activated carbon and carbon fibers. The semiconductors have greater resistivities as compared to most forms of carbon and are typically at least one, in some cases two orders of magnitude higher in electrical resistivity. For purposes of this invention, non-conductors can be considered to have a resistivity greater than 10 ohm-cm at ordinary temperatures. True insulators have resistivities in the hundreds or thousands of ohm/cm. Electrically conductive or semiconducting support materials having a resistivity greater than 0.1 ohm-cm are not preferred As will be apparent from the foregoing discussion, the preferred hydrophobic used in the GDE structure are fluorinated ethylene propylene (FEP), polytetrafluoroethylene (PTFE), polytrifluorochlorethylene, and the like, FEP or PTFE and its copolymers being particularly preferred. The essentially fully fabricated but untreated GDE used as a starting material in this invention can be treated on one side with hydrophobic polymer and pressed and/or subjected to sintering temperatures prior to use in the impregnation step described subsequently.

THE PROCESS

The process of this invention converts a GDE which is essentially fully fabricated but can be totally free of noble or precious metals into a high-utilization noble and/or precious metal-containing GDE suitable for use in an electrochemical cell provided with an ion-exchange electrolyte, such as a fluorinated solid polymer electrolyte. An extremely important step in the process involves impregnation of the low-performance GDE, i.e the GDE which is essentially free of noble or precious metal. (As noted above, it is convenient to refer to the starting material of the process as an "uncatalyzed" GDE, even though an "uncatalyzed" support material such as high surface area carbon may have some catalytic activity of its own.) The low performance GDE, as noted above, has a hydrophobic layer or "gas side" and a catalyzable layer or side. The "gas side" of the GDE should permit relatively free influx of a reactant gas. The catalytic layer of the GDE is porous so as to facilitate the formation of complicated interfaces between reactant gas, electrolyte, and electrocatalyst. Accordingly, the impregnation step of this invention must be carried out with great care so that the ion-exchange material used as the electrolyte penetrates into the catalyzable layer reasonably well but does not significantly change the gas-permeability properties of the gas side of the electrode. Accordingly, the impregnation proceeds from the outermost surfaces of the catalytic face inward, partway into the cross-section of the untreated GDE, but generally not so far as the backing sheet which provides the gas-permeable regions for the reactant gas to enter from the gas side. Fully treated electrodes prepared according to this invention have been examined microscopically and it has been found that little or no solid polymer electrolyte penetration of the backing sheet or backing layer occurs.

The preferred technique for impregnating selectively, so that the hydrophobic face is not substantially affected, involves bringing the catalyzable face of the GDE into face-to-face contact with a solution containing dissolved ion-exchange polymer, e.g. the upper surface of the solution or a pre-impregnated sponge, pad, felt, etc., containing this solution. The simplest way to carry out this technique is to float the GDE, catalyzable face down, on the surface of an s.p.e. solution. At room temperature (15-25° C.) or moderately elevated temperatures below 100° C., impregnation proceeds fairly rapidly from the catalyzable face inward, but only part way through the cross-section of the GDE. When the catalyzable face comprises carbon and fluorinated hydrophobic polymer, after only a few seconds of impregnation the loading of s.p.e. on the catalytic face of the GDE is more than 0.5 mg/cm$^2$; after 30 seconds this loading has increased to 1 to 2 mg/cm$^2$. The loading continues to increase for a period of hours (e.g. up to 24 hours), but loadings of s.p.e. of 0.5 to 2.0 mg/cm$^2$ (e.g. 1.5 mg/cm$^2$) are adequate, such loadings being readily achieved in less than 12 hours.

The concentration of s.p.e. in the solution can range from 0.1 to 50 parts by weight per 100 parts by weight of solution, preferably 1-10 weight-%, based on the weight of solution. This preferred range provides ease of impregnation and rapid drying of the impregnated electrode at ambient temperatures after impregnation.

The dissolved solid polymer electrolyte is absorbed into the mass of finely divided support material on the surface of the catalytic face through capillary action. Thus, for ease of impregnating it is prefered that carbon support materials have some surface functionality, (e.g. oxygen-containing groups such as OH, —COOH, etc.), which is already the case for many commercially-available high surface area carbons. Graphitized carbon materials can, if necessary, be provided with surface functionality through treatment with oxidizing agents or, less preferably, by electrochemical treatment.

The selection of solvent for the solid polymer electrolyte or ion-exchange polymer can also play a role in promoting ease of impregnation. Because ionic or ionizable functional groups (e.g. —SO$_3$H, —SO$_3$Na, —SO$_3$NH$_4$, etc.) are present in these polymers, the polymers themselves have some degree of compatibility with polar organic solvents and with water. As pointed out by W. G. Grot in U.S. Pat. No. 4,433,082, preferred liquid organic polar solvents include lower aliphatic (C$_1$-C$_6$, especially (C$_1$-C$_4$) alcohols, particularly primary and secondary alcohols, lower alkoxy-substituted lower alcohols, lower aliphatic glycols and glycol ethers and diglycol ethers, other lower aliphatic ethers (such as diethyl ether), cyclic ethers such as dioxane, and lower aliphatic nitriles such as acetonitrile. Typical commercially available perfluorinated ion exchange polymers having sulfo groups and an equivalent weight in the range of 1025 to 1500 can be dissolved in a mixture comprising 20-90 wt.-% water and 10 to 80% by weight of one or a combination of the above-described polar organic solvents. Formation of the solution from the s.p.e. and the solvent mixture takes place at about 180 to 300° C.

The thus-floated GDE is carefully removed from the surface of the s.p.e. solution so as not to wet the "gas side" (the fluid-permeable face) of the electrode with solution. As indicated earlier, impregnation of s.p.e. solution into the gas side could block gas pores and potentially hinder the gas transport properties of the electrode.

Excess solution is allowed to drain off the catalytic face, and the thus-treated GDE is preferably cured in air or in an inert gas at room temperature (15-25° C.) or elevated temperatures for 0.5 to 24 hours, e.g. 8 to 16 hours. It is generally most convenient to impregnate in a single step and air-cure or air-dry in a single step, rather than intersperse a plurality of incremental impregnations and incremental dryings, but incremental impregnation and drying are also operative.

The preferred ion-exchange polymers have more than 3 repeating units and are solid at room temperature. These polymers can be either homopolymers or copolymers made from two, three, or even four different monomers. At least one of the monomers preferably is partially or fully fluorinated, contains at least one unsaturated site, and is provided with a pendent group terminated with an ionic or ionizable radical. The pendent group can be a side chain terminated with an acidic, basic, or salt-like radical, and the side chain can be in the nature of a halohydrocarbon or a halohydrocarbon ether.

Thus, a particularly preferred monomer is either

  (I)

or

  (II)

where Z is the ionic or ionizable group, preferably an acidic radical,
the R$_f$ radicals, which are the same or different, are F, perfluoroalkyl, or Cl, preferably F or lower (C$_1$-C$_6$) perfluoroalkyl,
n is a number ranging from 0 to 10, and
m is a number ranging from 1 to 10.

Particularly when monomer (II) is selected, by itself or in combination with another monomer, care should be taken to insure that the resulting s.p.e. can be dissolved in a mixture of lower aliphatic alcohols and water at temperatures below 300° C.

Co-monomers useful with monomers (I) and (II) include

  (III)

where R$_f$ is as defined previously and is preferably R or CF$_3$.

Again, care must be taken so that the number of repeating units derived from monomer (III) does not totally impair ease of solubility in polar solvents.

Since it is particularly preferred that Z have cation-exchange properties, Z is typically an acidic radical such as —$SO_3H$. Other acidic radicals are disclosed in the s.p.e. art, including —COOH, —$PO_3H_2$, —P(R$_f$)$O_2H$, —B(R$_f$)OH, and —B(OR$_f$)OH, where R$_f$ is as defined previously.

A particularly preferred commercially available s.p.e. contains fluorinated repeating units and pendent groups terminated with —$SO_3H$ radicals and is sold under the trademark NAFION ® by E. I. duPont de Nemours and Company of Wilmington, Del., U.S.A.; NAFION ® trademark) is soluble in mixtures of aliphatic alcohols and water and is available in solution form.

The curing or drying of the impregnated electrode fixes the s.p.e. in place as a kind of membrane on the surface of the catalytic face which is in highly intimate contact with the support material and even includes snake-like or tree limb-like branching incursions into the cross-section of the electrode. The thus-deposited s.p.e. will not be attacked or re-dissolved by the aqueous electrolyte at ordinary or moderately elevated temperatures (e.g. 20–100° C.); accordingly, the intimate contact with the support material is not adversely affected when the treated GDE is immersed in a plating bath.

In the electrodeposition step, the GDE (treated with s.p.e. as described above) is assembled in a parallel flow electroplating flow cell. The electrolyte or plating bath typically contains dissolved noble metal or precious metal in a concentration of about 1–50, more typically 1 to 20 g/l. When the s.p.e. impregnated into the catalytic face of the GDE is proton-exchanging (as is the preferred, it is preferred NAFION ® polymer), it is preferred that the noble metal or precious metal-containing ions in the plating bath be cations, e.g. $Pt^{++}$, $Au^{+++}$, $A^+$, $Ag^+$, $Pd^{++}$, $Ir^{+++}$, $Rh^{+++}$, $Ru^{+++}$, $Os^{+++}$, etc., rather than anions such as $AuCl_4^-$ or $PtCl_6^=$. If the catalytic metal to be applied to the "uncatalyzed" GDE is a non-noble metal, $Ni^{++}$, $C^{++}$, $C^+$, or $Hg^{++}$ can be employed, or, less preferably, ions of manganese, tungsten, molybdenum, tantalum, or one of the rare earths. The most preferred cation is $Pt^{++}$. Alloying of metals can be achieved in situ by using a plating bath containing a mixture of cations.

It is preferred that the plating bath be circulated though the electroplating flow cell at a rate which will minimize mass transport limitations. The electrodeposition of noble or precious metal (or noble and/or precious metal alloys) is preferably carried out at room temperature (15–25° C.) or moderately elevated temperatures well below the boiling point of water.

A pulse current rectifier provides the desired interruptions in current flow or imposes a wave form with the desired peak current density, on-times, off-times, and pulse periods (pulse period reciprocal of frequency = on-time + off-time). Interrupted direct current offers important advantages, particularly in the control of nucleation and growth of noble metal or precious metal particles, in improved adherence to the support (carbon) of the electrodeposited metal particles which are formed, in the high surface area resulting from the uniformly small size of these catalytic metal particles, and in lower internal stress. Recently it has also been discovered that interrupted D.C. can initiate secondary nucleation, produce very fine crystallites, and form more porous deposits. Although this invention is not bound by any theory, these effects can probably be attributed to the fact that the interrupted or waveform-shaped current modifies the mass transport processes, enhances the rate of nucleation, and improves the kinetics of the reaction.

High instantaneous current densities (above about 5 mA/$c^2$, though less than 1000 mA/$cm^2$, preferably 10 to 100mA/$cm^2$) generally assist in controlling nucleation and preventing agglomeration or smooth plating effects. A low duty cycle (on-time divided by "pulse" or on-time period) and a "pulse" period shorter than 5 minutes is preferred. It has been found that the presence of ion-exchange polymer on the catalytic face also inhibits agglomeration of metal particles and/or metal particle growth. The nucleation density of the electrodeposited metal is directly proportional to the applied current density, and the instantaneous current density can be 2 or 3 orders of magnitude greater than the DC limiting current density. The length of the on-time is believed to control the growth of deposited metal nuclei and to help keep the electrodeposited metal particles dispersed throughout the support material, hence on-times should be short enough to keep the size of the metal particles below 100Å (preferably <50Å) and to avoid formation of agglomerated metal particles which may lose discreteness, leading to an undesired agglomeration or film-forming effect. The metal-containing ions must traverse the solid polymer electrolyte to be deposited on nuclei for the formation of electrodeposited metal particles. On-times of 0.005 to 5 minutes, more typically 0.01 to 2 minutes can be used, about 0.1 to 0.5 minute being especially preferred. Because the solid polymer electrolyte present in the treated GDE tends to inhibit agglomeration, plating or film-forming effects, on-times of up to 2 minutes can be used without observing metallic particle growth to sizes significantly larger than 50Å (5 nm). On-times of less than 0.1 minute may possibly produce particles smaller than 15Å (1.5 nm)——smaller than necessary for use in this invention. The optimum size of the deposited catalytic metal particles is generally in the range of about 20 to about 4Å (2 to 4 nm).

ELECTROCHEMICAL CELLS

The fully treated and fully catalyzed GDE's of this invention can be used as cathodes or anodes in electrochemical cells which utilize reactant fluids fed to the fluid-permeable face of the cathode or anode and have one or more polymeric ion-exchange electrolyte media disposed between the cathode and anode to provide the ionic pathway or pathways between cathode and anode. Typically, the membrane-like layer of solid polymer electrolyte formed on the catalytic face of the anode and cathode may be sufficient by itself to serve as the electrolyte of the cell, but if desired, the electrode may be bonded onto either side of a solid polymer electrolyte membrane. Alternatively, a liquid electrolyte can be interposed between the solid polymer electrolyte-coated electrodes in which case ions (preferably protons) formed at catalytic sites on the catalytic layer of the anode are transported through the solid-polymer-electrolyte impregnation/coating on that layer of the anode to the liquid electrolyte, and ions (preferably protons) from the liquid electrolyte are transported through the solid-polymer-electrolyte impregnation/coating on the catalytic side of the cathode to catalytic sites on the cathode, where water or the like can be formed from oxygen or the like. Preferred liquid electrolytes are aqueous solutions of acids, especially inorganic acids such as phosphoric acid, sulfuric acid, hydrochloric acid, perchloric acid, etc. In this solid polymer/aqueous acid/solid polymer electrolyte configuration, the anions of the aqueous acid do not come into contact with any catalytic sites; the only electrolyte in contact with the noble metal or precious metal anode electrocatalyst is immobilized, fully solidified ion-exchange polymer. If a liquid electrolyte is used, it is particularly important that the cathode be s.p.e.-treated, even if the anode is not.

Techniques for attaching leads or external circuitry to electrodes of this invention are conventional and known to anyone skilled in the art. The external circuit from cathode to anode can include a load (such as an electric motor or electric light), a galvanometric measuring device, switching means, etc.

Anodes made according to this invention can provide a surface for electrocatalytic oxidation of a variety of reactant fluids, including hydrogen, organic compounds (e.g. alcohols, alkenes, etc.), ammonia, hydrazine, volatile or volatilizable hydrides (borane, etc.), oxides of low or intermediate oxidation state (e.g. $SO_2$), etc. It is preferred that these reactants be fed to the fluid-permeable face of the anode in gaseous form (alone or in admixture with a carrier gas), but techniques for feeding liquids or aqueous solutions to the "gas" side of a GDE are known. When the essential purpose of the cell is to produce electric power, the preferred reactant gases are "fuels" such as hydrogen, lower alcohols (used directly or reformed), hydrocarbons (especially when reformed), ammonia or hydrazine, volatile hydrides, and the like. If the purpose of the cell is to provide electrochemical synthesis (i.e. limited oxidation), the preferred reactant gases are organic compounds, $SO_2$ (which is convertible to $SO_3$ or $H_2SO_4$), and the like.

Cathodes made according to this invention can provide a surface for electrocatalytic reduction of fluids such as air, oxygen, halogens, peroxides such as $H_2O_2$, nitric oxide, and organic compounds. Again, it is preferred that these fluids be in a gaseous state. If the cell is a fuel cell, the preferred reactant gas (oxidant) is air or oxygen. Electrochemical synthesis can also take place at the cathode; for example, nitric oxide can be reduced to nitrous oxide, hydroxylamine, or ammonia, aldehydes or nitriles can be reductively dimerized, etc.

Electric power can be produced in the synthesis mode as well as the fuel cell mode, and electric power can also be produced if the cathode is a GDE of this invention but the anode is an oxidizable metal such as lead, iron, zinc, etc. Operating temperatures of electrochemical cells of this invention can range from below room temperature (and even below 0° C., due to the excellent cold-start capability of s.p.e. fuel cells) to well above 100° C., e.g. about 150° C., which is still well below the decomposition temperature of most s.p.e.'s.

For fuel cell use, the loading of noble metal on cathodes and anodes made according to this invention can be far below the 4 mg/cm² typical of many state-of-the-art $H_2/O_2$ s.p.e. fuel cells. Loadings <2 mg/cm², more preferably <mg/cm² are sufficient. In fact, an s.p.e. fuel cell of this invention with a loading of only 0.05 mg/cm² of platinum exhibited the same performance as a conventional $H_2/O_2$ fuel cell with a 0.5 mg Pt/cm² loading, i.e. an order of magnitude improvement over conventional cells and almost two orders of magnitude of improvement compared to most s.p.e. fuel cells. Thus, with s.p.e. fuel cells of this invention, one has the choice of using a lesser noble metal loading to get the same performance as a conventional cell or obtaining higher performance at a given loading.

This improvement in the utilization of noble metal in the GDE catalyst has major implications for government and industry, particularly in view of the self-heating feature of s.p.e. fuel cells which enhances their cold-start and cold weather performance. Commercial and governmental applications of s.p.e. fuel cell technology include auxiliary or primary power for ships or submersibles, offshore platforms, remote navigation systems, regenerative energy receptors for space, highway bus applications and other electric vehicles (including automobiles).

The principle and practice of this invention is illustrated in the following non-limiting Example.

EXAMPLE

NATION ® Impregnation of High Surface Area Carbon

Gas Diffusion Electrode (GDE)

A plain carbon, planar gas diffusion electrode was prepared using high surface area KETJENBLACK EC300J carbon (Azko-Chemie America) which was sieved through −170 mesh screen. The carbon was dispersed in an acidified aqueous solution. 30 wt % TEFLON ® binder was added using a dilute suspension of TFE-30 (DuPont) and the suspension was mixed with stirring and sonification. The resulting slurry was filtered and transferred onto a hydrophobic polymer-treated porous carbon paper substrate (Stackpole PC206) to form a uniform layer on the carbon paper. The hydrophobic polymer used to treat the porous carbon paper substrate was fluorinated ethylene-propylene (FEP). The electrode was then cold pressed, hot pressed and sintered at 300° C. The resulting electrode had a gas-permeable face characterized by a high concentration of FEP and an opposite (catalyzable) face having a high concentration of KETJENBLACK.

The plain carbon GDE electrode sample was floated, carbon face down, on the surface of a solution of solubilized NAFION ® in a shallow beaker. The solution was made up of 5 w/o NAFION ® 1100 EW dissolved in a mixture of lower aliphatic alcohols and water (Solution Technologies, Inc.). The NAFION ® was absorbed into the carbon layer of the catalytic face through capillary action. The solution impregnation period was 30 seconds.

The electrode was then carefully removed from the NAFION ® solution so as to not wet the gas-permeable side of the electrode with solution. Excess solution was allowed to drain off of the electrode surface and the electrode was subsequently air cured at room temperature for 12 hr. The NAFION ® loading in the electrode was determined by difference (mass of electrode after impregnation—mass of electrode before impregnation).

The impregnation period of 30 seconds provided a 100 cm²-size NAFION ® impregnated gas diffusion electrode with a NAFION ® loading of 1.5 mg/cm². The NAFION ®-impregnated electrode was examined using scanning electron microscopy (SEM) in order to gain insight as to the extent of impregnation in the electrode structure. Micrographs confirmed the presence of NAFION ® throughout high surface area carbon layer on the carbon paper substrate. (The NAFION ®- treated, exposed surface of this layer is hereafter referred to as the "catalytic face".) Regions of NAFION ® incorporated into the high surface area carbon layer structure were apparent at all magnifications. However, examination of the carbon fiber paper backing of the electrode showed no evidence of NAFION ® present.

The effect of solution impregnation time on NAFION ® loading was also investigated. A longer solution impregnation period (12 hours) was also used and the resulting NAFION ® loading was determined. The longer impregnation period nearly doubled the NAFION ® loading in the electrode—from 1.5 mg/cm$^2$ to 2.5 mg/cm$^2$. The catalyzation step was done using the lower NAFION ®-impregnated electrode.

Catalyzation of NAFION ® Coated GDE Using Interrupted D.C.

The NAFION ®-impregnated plain carbon, planar GDE treated for 30 seconds (1.5 mg NAFION ® per cm$^2$) was assembled in a parallel plate flow cell with platinum screen as the counter-electrode. The electrolyte was an acid platinum plating bath solution (Technic Inc.) with a metal concentration of 10 g/l. a peristaltic pump was used to circulate the electrolyte through the cell to minimize mass transport limitations. The catalyzation was carried out at room temperature. The electrode size was 50 cm$^2$. A pulse current rectifier (Kraft Dynatronix) was used to polarize the electrode galvanostatically to produce long "pulses" (on-times), i.e. interrupted D.C. of desired peak current density, on-time and duty cycle. The peak "pulse" current density ranged from 10 to 50 mA/cm$^2$; and the on-time of the pulse varied from 0.02 to 2.0 min. By this procedure, the catalyzable (uncatalyzed carbon) face of the GDE was catalyzed (or further catalyzed, if the carbon is considered catalytic) with metallic platinum.

The platinum catalyzation procedure involved: (1) installation of the electrodes and setup of the parallel plate flow cell; (2) starting the pump and circulating the electrolyte through the cell ensuring to remove any trapped gas bubbles inside the cell; (3) the setup of controls at the pulse current rectifier to generate the desired PC current waveform; (4) polarization of the electrode for the desired length of time; (5) removal of the electrode from the cell; (6) washing and drying of the electrode The Pt particle size and the nature of electrodeposit obtained was determined by carefully scraping the electrocatalyst surface and transfering the powder to the TEM support grid for analysis.

The loading of Pt catalyst was determined gravimetrically by placing a known area of an electrode sample in a tared quartz crucible and transferring it into the heated zone of a tube furnace. The sample was oxidized in air at 950° C. for 2 hr. The weight of the Pt residue (i.e., Pt) was determined by difference using an ultra-microbalance and the loading of the platinum was determined from the weight and area measurements. An electrode sample of a known platinum content was first used to check the validity of the test procedure.

Results of transmission electron micrographs (SEM's) are summarized below.

| On-Time, min. | Peak Current Density (mA/cm$^2$) | Results |
|---|---|---|
| 0 | — | All carbon and NAFION ®, no Pt in samples |
| conventional fuel cell electrode, colloidal deposition of Pt on high surface area carbon | | 10 wt. % Pt, 0.5 mg Pt/cm$^2$, average Pt particle size about 20Å (2 nm) |
| 0.01 | 10 | Pt particle size = 5 to 10Å (0.5-1 nm) |
| 0.5 | 10 | Dispersed Pt, average Pt particle size is 20-30Å (2-3 nm) |
| 2.0 | 10 | Average Pt particle size still about 20-30Å (2-3 nm) |

Electrochemical Activity and Analytical Results

Polarization measurements were done in a half cell in sulfuric acid media to determine the activity of our electrocatalyst for the fuel cell reactions of interest, namely, oxygen reduction and hydrogen oxidation.

The half cell testing procedure utilized a sweeping method for evaluating electrodes. The current was swept at 1.0 mA/s between preset limits while the potential was monitored. The electrode testing was done in 2.5M sulfuric acid and the temperatures ranged from 25 to 70° C. A PAR (Princeton Applied Research) model 363 potentiostat was used in the galvanostatic mode for the test. Readings of the current, electrode potential and iR potential were recorded every 5 seconds during the first 30 seconds of the scan, then every 10 seconds thereafter. The iR-corrected electrode potential was plotted versus current density on the computer's screen in real time and the polarization data stored for later use.

Polarization measurements were done with oxygen, air and hydrogen. Plots of iR-corrected potential versus current density and mass activity were generated from the polarization data and the catalyst loading data for the different gases to examine the electrode performance and the electrochemical activity of the electrocatalyst.

Gravimetric analysis showed that the conventional 10 wt.-% Pt-on-C electrode loaded with 5 mg/cm$^2$ of Pt+C (a theoretical loading of 0.5 mg Pt/cm$^2$) had an actual loading of 0.53 mg Pt/cm$^2$. The NAFIO ®-treated electrodes of this invention treated further in the Pt-catalyzation with pulsed-D.C. having a peak current density of 10 mA/cm$^2$ and a pulse period of 2 minutes, assuming an a 10% a current efficiency, should have had a theoretical Pt loading of approximately 0.1 mg/cm$^2$. Gravimetric analysis showed an actual loading of 0.05 mg Pt/cm$^2$.

Comparison plots of iR-corrected oxygen reduction performance on oxygen and air for the above-described GDE of this invention (0.05 mg Pt/cm$^2$) compared to a standard electrode prepared with a NAFION ®-impregnated 10 percent platinum on carbon electrocatalyst (~0.5 mg Pt/cm$^2$) indicated no difference in oxygen reduction performance for oxygen between the standard electrode and the electrode of this invention even though the electrode of this invention contains one tenth the platinum as the standard electrode. The performance of both electrodes is nearly equivalent on air as well, with the electrode of this invention only slightly worse than the standard electrode at higher current densities.

Analogous half cell polarization experiments were conducted to measure the hydrogen oxidation activity of the electrode of this invention in comparison to the standard NAFION ®-impregnated 10 percent platinum-on-carbon electrocatalyst. A comparison plot of iR-corrected hydrogen oxidation performance versus current density shows similar performance behavior for both the electrode of this invention and the standard electrode although the standard electrode contains ten times more platinum. The above-described results are attributed to a much higher utilization of the platinum due to the more selective catalyzation which more effectively locates the platinum catalyst particles at the three-way interface of the GDE's of this invention. The implication of this demonstrated increase in the utilization of the platinum catalyst lies in the eventual production of less expensive s.p.e. fuel cells through either the decrease of the catalyst loading or the increase in cell performance with electrodes of this invention. In practicing this invention and obtaining this high utilization of electrocatalytic metal, results are reliably reproducible; hence, good quality control is obtainable.

We claim:

1. A process for increasing the electrocatalytic activity of a gas-diffusion electrode having a gas-permeable face, and opposite thereto, a catalyzable face comprising a support material, said gas-diffusion electrode being substantially free of catalytic metal on the surface of said support material, said method comprising:
   a. impregnating into the catalyzable face of the gas-diffusion electrode a solution comprising an ion-exchange polymer, until said solution has wetted the catalyzable face of the gas-diffusion electrode and has penetrated part way into the cross-section of the untreated gas-diffusion electrode, thereby depositing ion-exchange polymer in contact with the support material, said gas-diffusion electrode, prior to this impregnating step, being substantially free of noble or precious catalytic metal on the surface of the support material and also substantially free of ion-exchange polymer,
   b. inserting the thus-treated gas-diffusion electrode resulting from said step a., along with a counterelectrode, into a plating bath containing ions, said ions including ions which contain a noble or precious catalytic metal in oxidized form,
   c. applying direct current to the said ion-exchange polymer-treated gas-diffusion electrode and the counterelectrode, and interrupting the direct current so that noble or precious catalytic metal particles not larger than about 10 nanometers in average particle size deposit on the support material of the catalyzable face of said treated gas diffusion electrode wherein a resulting loading of the catalytic metal particles is less than 4 mg per geometric square centimeter of catalyzable face, the depositing of these catalytic metal particles on the support material of the catalyzable face taking place essentially only on sites where support material is in contact with previously-deposited ion-exchange polymer.

2. A process according to claim 1 wherein the support material comprises particles or fibers or sintered particles or fibers comprising carbon or a non-noble, non-precious metal or an electrically-conductive or semi-conducting inorganic compound.

3. A process according to claim 1, wherein said solution comprises a fluorinated cation-exchange polymer dissolved in a polar liquid organic solvent or a polar liquid organic solvent mixed with water.

4. A process according to claim 3 wherein, in said step a, the untreated gas-diffusion electrode is floated on the surface of said solution such that the catalyzable face of the untreated gas-diffusion electrode is in face-to-face contact with the surface of the solution.

5. A process according to claim 3 wherein, in said step a, said solution comprises 0.1 to 50% by weight of fluorinated cation-exchange polymer, based on the weight of the solution, said solvent having a boiling point at atmospheric pressure not greater than about 150° C.

6. A process according to claim 5 wherein, during or subsequent to the completion of said step a but prior to said step b the polar liquid organic solvent is evaporated from the thus-treated gas-diffusion electrode so that the deposits of ion-exchange polymer in contact with the support material become substantially immobilized, solidified material.

7. A process according to claim 1 wherein the support material comprises particles or fibers or sintered particles or fibers comprising carbon or an electrically conducting or semiconducting oxide of a non-noble, non-precious transition metal, and the catalytic metal deposited on the support material consists essentially of a particulate metal of Group VIII or Group I-B of the Periodic Table of the Elements, the particles of said particulate metal averaging less than 5 nanometers in size.

8. A process according to claim 1 wherein the ion-exchange polymer is a cation exchange polymer, and the plating bath of said step b contains cations of a metal of Group VIII or Group I-B of the Periodic Table of the Elements.

9. A process according to claim wherein the loading of catalytic metal on the support material resulting from said step c is about 0.01 to about 2.0 mg per geometric square centimeter of catalyzable face.

10. A process according to claim 9 wherein said loading is about 0.03 to about 1.0 mg per geometric square centimeter of catalyzable face.

11. A process according to claim 1, wherein the pulsed direct current of said step c thus interrupted, is selected to produce adherent deposits of catalytic metal and particles of catalytic metal which are smaller on the average than 10 nanometers.

12. A process according to claim 11 wherein the thus-interrupted direct current is governed by a wave form selected such that the peak current density is at least about 5 mA/cm² and the on-time is less than 5 minutes.

13. A process according to claim 12, wherein the wave form is selected such that the peak current is about 10–100 mA/cm² and the on-time is 0.1 to about 2 minutes.

14. A process according to claim 1, wherein the ion-exchange polymer is a solid polymer obtained by polymerizing an unsaturated monomer of the formula $$Z-CF(R_f)CF(R_f)O[CR_fCF_2O]_n CR_f=CFR_f \qquad (I)$$

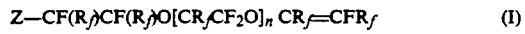

or $$Z[CF(R_f)]_m CR_f=CFR_f \qquad (II)$$

wherein Z is an ionic or ionizable group, the $R_f$ radicals, which are the same or different, are F, fluoroalkyl, perfluoroalkyl, or Cl, n is a number ranging from 0 to 10, and m is a number ranging from 1 to 10.

15. A process according to claim 14, wherein Z is an acidic group selected from $-SC_3H$, $-COOH$, $-PO_3H_2$, $-P(R_f)O_2H$, $-B(R_f)OH$, and $-B(OR_f)OH$.

16. A process according to claim 14, wherein said unsaturated monomer is co-polymerized with a second unsaturated monomer of the formula $CFR_f = CFR_f$.

17. A treated, fully catalyzed, gas-diffusion electrode made by the process of claim 1 and having a loading of catalytic metal on the support material resulting from said step c. which is less than 4 mg per geometric square centimeter of catalyzable face.

18. An electrochemical cell comprising a cathode, an anode, and an electrolyte comprising a solid polymer electrolyte comprising an ion-exchange polymer or a liquid electrolyte, wherein either the cathode or the anode or both is or are a gas-diffusion electrode or the electrodes of claim 17.

19. A fuel cell comprising a cathode, an anode, means for providing a flow of fuel to the anode, means for providing air or oxygen to the cathode, and an electrolyte comprising a cation-exchange polymer or an aqueous solution of an acid for providing an ionic pathway between the cathode and the anode, wherein the anode comprises or the anode and the cathode comprise a gas-diffusion electrode mode by the process of claim 17.

20. A process according to claim 1, wherein said gas-diffusion electrode which is impregnated in said impregnating step has a gas-permeable face comprising a hydrophobic polymer and an opposite face comprising a particulate or fibrous electrically conductive material.

* * * * *

UNITED STATES PATENT AND TRADEMARK OFFICE
CERTIFICATE OF CORRECTION

PATENT NO. : 5,084,144
DATED : Jan. 28, 1992
INVENTOR(S) : N.R. K. Vilambi Reddy, et al It is certified that error appears in the above-indentified patent and that said Letters Patent is hereby corrected as shown below:

In column 7, at line 66, "Phan" should read --Phase--.

In column 11:

at line 39, "A+" should read --Au+--;

in line 42, "C++" should read --Cu++--;

in line 43, "C+" should read --Cu+--.

In column 12, at line 42, "4Å" should read --40Å--.

In column 13, at line 63, "<mg/cm$^2$" should read --<1mg/cm$^2$--.

In column 16, at line 49, "The NAFIO" should read --The NAFION--.

Column 16, line 53, "an a 10% a" should read --a 10%--

UNITED STATES PATENT AND TRADEMARK OFFICE
CERTIFICATE OF CORRECTION

PATENT NO. : 5,084,144
DATED : Jan. 28, 1992
INVENTOR(S) : N. R. K. Vilambi Reddy, et al It is certified that error appears in the above-indentified patent and that said Letters Patent is hereby corrected as shown below:

In claim 4, column 18, line 6, "a," should read --a.,--.

In claim 5, column 18, line 11, "a," should read --a.,--.

In claim 6, column 18, line 17, "a" should read --a.--; at column 18, line 18, "b" should read --b.--.

In claim 9, column 18, line 38, "claim wherein" should read --claim 1 wherein--; at column 18, line 40, "c" should read --c.--.

In claim 11, column 18, line 46, "c" should read --c.--.

Signed and Sealed this

Twenty-fourth Day of May, 1994

Attest:

BRUCE LEHMAN

*Attesting Officer*  *Commissioner of Patents and Trademarks*